Patented Dec. 19, 1939

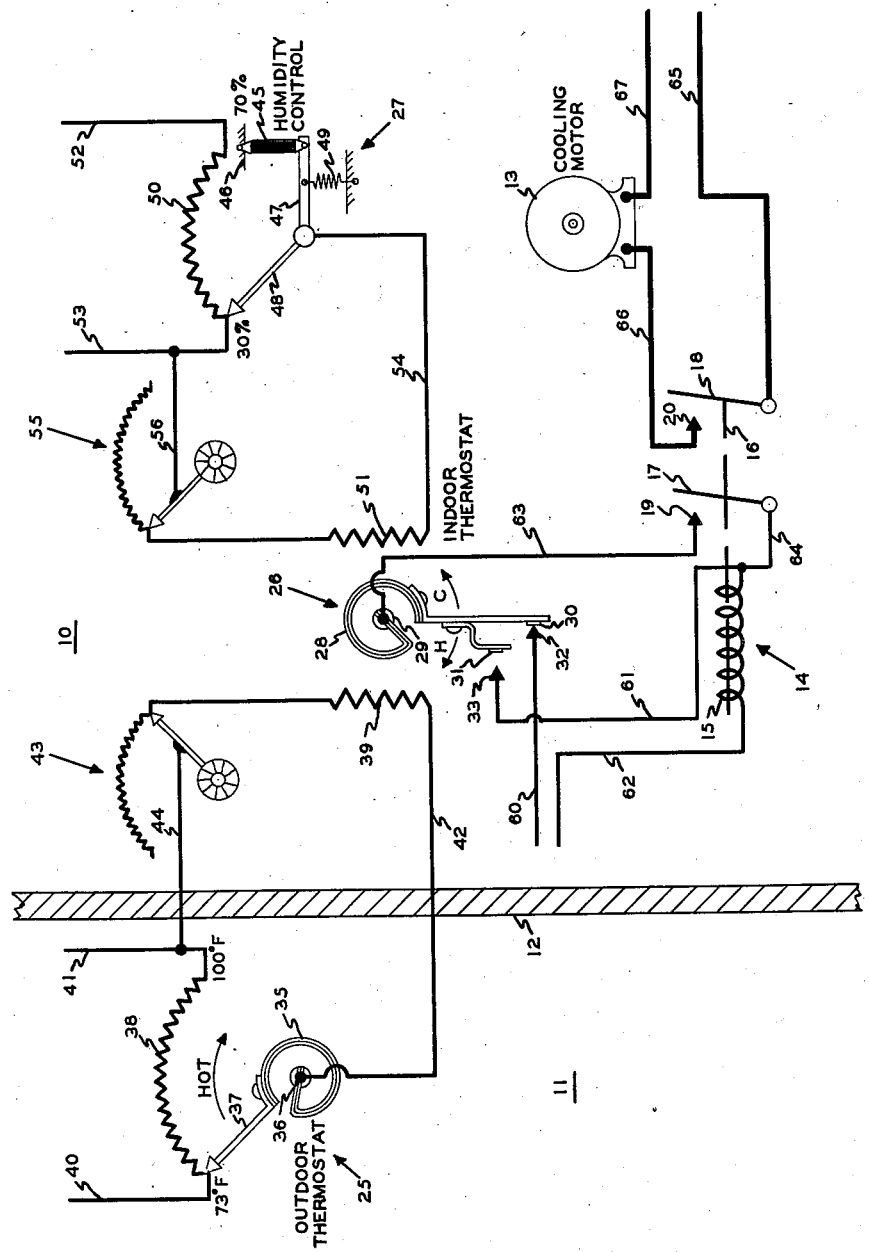

2,183,874

UNITED STATES PATENT OFFICE 2,183,874

AIR CONDITIONING SYSTEM

Paul F. Shivers, Wabash, Ind., assignor to Minneapolis-Honeywell Regulator Company, Minneapolis, Minn., a corporation of Delaware Application June 28, 1934, Serial No. 732,813

15 Claims. (Cl. 236—44)

The present invention relates to an air conditioning system by means of which the temperature of a space, or some other space condition, is controlled or modified upon fluctuations in the outdoor temperature and relates particularly to the modifying of space conditions by the outdoor temperature when the outdoor temperature is excessive or higher than the desired space temperature.

One of the objects of the present invention is the provision of a cooling system which is controlled by a space dry bulb temperature responsive thermal element, an outdoor temperature responsive thermal element and a space relative humidity responsive element in such a manner as to maintian the most advantageous conditions within the space whether the persons occupying the space remain there at all times or pass in and out of the space.

A further object of the invention is the provision of an automatically controlled cooling system by means of which the space temperature is allowed to increase upon an increase in the outdoor temperature, but at a slower rate, and in which the space temperature is decreased upon an increase in the relative humidity in the space.

A further object of the invention is the provision of an automatically controlled cooling system wherein the effective temperature of the space (a combination of the space dry bulb temperature and relative humidity, as is now well known in the art) is allowed to increase as the outdoor temperature increases.

A further object of the invention is the provision of an improved electrical means for modifying the response of a space temperature responsive thermal element upon changes in the outdoor temperature or upon changes in the space relative humidity.

In carrying out my invention, I provide a space temperature responsive thermal element which controls the space temperature through suitable means for cooling the space. I vary the response of the space temperature responsive thermal element both in accordance with the outdoor temperature and the space relative humidity. This variation in response of the space responsive thermal element is preferably obtained by utilizing variable resistances controlled by the outdoor temperature and space relative humidity. The outdoor variable resistance preferably controls the flow of current through an electric heater which furnishes auxiliary or local heat to the space temperature responsive element, the arrangement being such that the amount of local heat supplied thereto is decreased as the outdoor temperature rises, and is at a maximum when the outdoor temperature is approximately at some desired space temperature such as about 73° F. Similarly, the relative humidity responsive variable resistance is preferably arranged to control the flow of current to a second electrical heater which locally influences the space temperature responsive thermal element, the arrangement in this case being such that the amount of local heat supplied thereto is increased as the relative humidity increases. In this manner, as the outdoor temperature increases so as to decrease the amount of auxiliary heat furnished to the space temperature responsive thermal element, the space temperature must likewise increase to effect the same control over the cooling means. On the other hand, as the relative humidity increases and increases the supply of auxiliary heat to the space temperature responsive thermal element, the space temperature responsive thermal element will respond to lower space temperatures in its control of the cooling means.

Other objects of the invention will be found in the description, the drawing, and in the appended claims.

For a more complete understanding of the invention, reference may be had to the following detailed description and the accompanying single drawing, which is a diagrammatic showing of the preferred form of the invention.

Referring to the single drawing, the space to be controlled is indicated at 10, being separated from the outdoors, indicated at 11, by a wall shown at 12. The temperature of space 10 is adapted to be varied by any suitable means here in shown as a motor 13 which can control the cooling of the space in any of the manners well known in the art. The motor 13 is shown as controlled by a relay, generally indicated at 14. This relay 14 includes a relay coil 15 which, upon energization, attracts an armature 16 that in turn moves switch arms 17 and 18 into engagement with respective contacts 19 and 20. Energization of relay 14 is controlled by an outdoor resistance thermostat 25, a space temperature or indoor thermostat 26, and a space or indoor relative humidity responsive control 27. The control of the relay 14 by the space thermostat 26 is direct, whereas the control of the relay 14 by the humidity control 27 and outdoor thermostat 25 is indirect as will hereinafter appear.

The space thermostat 26 comprises a thermal element 28 which is illustrated as a coiled bimetallic element having one of its ends secured as at 29. The other end of thermal element 28 controls a pair of contact blades 30 and 31 which are adapted to engage sequentially a pair of cooperating contacts 32 and 33 upon an increase in the space temperature. The arrangement is such that contact blade 30 engages contact 32 prior to the time contact blade 31 engages contact 33 upon a rise in the space temperature.

The outdoor thermostat 25 includes a thermal element 35 which is shown as comprising a coiled bimetallic element. The thermal element 35 has one of its ends fixed as indicated at 36, and its other end controls a contact arm 37 which is adapted to sweep back and forth across a cooperating outdoor resistance 38 on changes in outdoor temperature. The arrangement is preferably such that contact arm 37 engages the extreme left-hand end or cold end of outdoor resistance 38 when the outdoor temperature is approximately 73° F. and engages the extreme right or hot end thereof when the outdoor temperature is 100° F. This outdoor thermostat 25 controls the flow of current to an electrical heater 39 for locally heating the space thermostat 26. The electrical heater 39 is shown as comprising an electric heating element located in proximity to the thermal element 28 of the space thermostat 26. A pair of wires 40 and 41, which are adapted to be connected to a suitable source of low voltage electrical power, are connected to the respective ends of outdoor resistance 38. The contact arm 37 is connected to one end of electrical heater 39 through the thermal element 35 by means of a wire 42. The other end of electrical heater 39 is connected to the right-hand end of outdoor resistance 38 through a rheostat 43 by a wire 44.

The humidity control 27 includes an actuating element 45 which is herein shown as comprising a plurality of strands of hair. One end of this actuating element 45 is secured as at 46, whereas the other end is connected to a pivoted member 47 that includes a contact arm 48. A coiled spring 49 operates to maintain the element 45 under the proper tension. The contact arm 48 cooperates with a humidity resistance 50, the arrangement being such that contact arm 48 engages the extreme left-hand end of humidity resistance 50 when the space relative humidity is approximately 30% and engages the right-hand end thereof when the space relative humidity is approximately 70%. This variable resistance humidity control 27 is adapted to control a second electrical heater 51 which is also shown as comprising an electrical heating element that is placed in close proximity to the thermal element 28 of space thermostat 26. Wires 52 and 53, which are adapted to be connected to a source of low voltage electrical power, are connected to the opposite ends of humidity resistance 50. The contact arm 48 is connected to one end of electrical heater 51 by a wire 54. The other end of electrical heater 51 is connected to the left-hand end of humidity resistance 50 through a rheostat 55 by means of a wire 56.

With the parts in the position shown, the relative humidity is approximately 30%, so that contact arm 48 is engaging the left-hand end of humidity resistance 50. Since the rheostat 55 is adjusted so as to exclude all of its resistance, the electric heater 51 is short-circuited, and no current flows thereto. The contact arm 37 is shown engaging the left-hand end of outdoor resistance 38 so that the outdoor resistance 38 and the electric heater 39 are connected in parallel, and the heater 39 is receiving the maximum possible flow of current. The heat supplied by the electric heater 39 to the thermal element 28 therefore raises the temperature of thermal element above the space temperature. The adjustment is preferably such that under these conditions the contact blade 30 moves into engagement with contact 32 when the space temperature rises to 73° F., and the blade 31 moves into engagement with contact 33 when the space temperature rises to 75° F. If the space temperature should rise to 75° F., for any reason, so as to bring contact blades 30 and 31 into engagement with their contacts 32 and 33, relay coil 15 will be energized by a circuit as follows: wire 60, contact 32, contact blade 30, contact blade 31, contact 33, wire 61, relay coil 15, and wire 62. Energization of relay coil 15 moves switch arms 17 and 18 into engagement with contacts 19 and 20. Engagement of switch arm 17 with contact 19 establishes a holding circuit for relay coil 15 which is independent of contact blade 31 and contact 33. This holding circuit is as follows: wire 60, contact 32, contact blade 30, thermal element 28, wire 63, contact 19, switch arm 17, wire 64, relay coil 15, and wire 62. Engagement of switch arm 18 with contact 20 energizes the cooling motor 13 as follows: wire 65, switch arm 18, contact 20, wire 66, cooling motor 13, and wire 67. The cooling controlling means will therefore operate to reduce the space temperature, whereupon contact blade 31 will disengage contact 33. The initial energizing circuit for relay coil 15 will thus be interrupted, but the holding circuit therefor will maintain energization of relay coil 15 until the space temperature falls below 73° F., whereupon contact blade 30 will disengage contact 32, and the relay coil 15 will be deenergized. Cooling motor 13 is thereupon deenergized, and cooling of the space is interrupted or reduced. In this manner, with the parts in the position shown, the indoor thermostat 26 will operate to maintain the space temperature between 73° F. and 75° F.

If the relative humidity should rise, the effective temperature will thereby be increased. Such rise in the relative humidity, however, is accompanied by movement of contact arm 48 along humidity resistance 50 towards the right-hand end thereof. This places a portion of humidity resistance 50 in parallel with the electric heater 51, whereupon a proportionate amount of current flows through the electric heater 51. The transmission of this heat to the thermal element 28 causes the contact blades 30 and 31 to engage their contacts 32 and 33 at space temperatures below 73° F. and 75° F. respectively. In this manner, the space temperature is maintained at progressively lower values as the relative humidity of the space increases from 30% to 70%. The maximum heating effect of electric heater 51 is preferably such that it transmits 4° of heat to the thermal element 28, so that the effective space temperature is maintained substantially constant upon variations in relative humidity, although the actual dry bulb temperature of the space is lowered.

If the outdoor temperature should rise, contact arm 37 will move along outdoor resistance 38 towards the right-hand end thereof so as to place a smaller amount of resistance 38 in parallel with the electric heater 39. In this manner, the heating effect of the heater 39 upon the thermal element 28 is reduced as the outdoor temperature increases so that progressively higher space temperatures are necessary to cause closure of contact blades 30 and 31 against their respective contacts 32 and 33. When the outdoor temperature reaches 100° F., the heater 39 is short-circuited, and thereafter no further change in the response of indoor thermostat 26 can be obtained upon further increase in outdoor temperature. The maximum heating effect of heater 39 on space thermostat 26 is preferably such as to raise the temperature of thermal element 28 seven degrees above the space temperature. The space temperature is therefore allowed to increase seven degrees while the outdoor temperature increases 27°.

In this manner, the space dry bulb temperature is varied from an average of 70° F. to an average of 81° F. if the relative humidity varies from 70% to 30%, and the outdoor temperature varies from 73° F. to 100° F. For all intermediate values of relative humidity and the outdoor temperature, the average space temperature maintained will assume some intermediate value which produces the greatest comfort for all conditions of occupancy, including the moving of persons in and out of the space. Looking at the invention from another angle, the space thermostat 26 and humidity responsive controller cooperate to maintain a constant effective temperature which is varied according to fluctuations in the outdoor temperature.

The rheostats 43 and 55 may be utilized to vary the heating effects of the electric heaters 39 and 51 upon the thermal element 28, so that varying adjustments in the indoor temperature can be obtained upon fluctuations in outdoor temperature and indoor relative humidity whereby the best results may be obtained for the particular conditions to which any specific installation is subjected.

While a specific embodiment of the invention has been illustrated, it will be appreciated that many changes can be made therein by those skilled in the art, and I therefore intend to be limited only by the scope of the appended claims.

I claim:

1. In combination, means for changing the temperature of a space, a space temperature responsive thermostat for controlling the temperature changing means, an electrical heater for locally heating the space temperature responsive thermostat for varying its response, and an outdoor temperature responsive means associated with the electrical heater for decreasing the current flow therethrough as the outdoor temperature rises at a rate such that the space temperature is raised to a lesser extent than the outdoor temperature rises.

2. In combination, means for changing the temperature of a space, a space temperature responsive thermostat for controlling the temperature changing means, an electrical heater for locally heating the space temperature responsive thermostat for varying its response, an outdoor temperature responsive means associated with the electrical heater for decreasing the current flow therethrough as the outdoor temperature rises, and means responsive to the relative humidity of the space for additionally controlling the temperature changing means.

3. In a summer cooling system, in combination, means for cooling a space, a space temperature responsive thermostat in control of the cooling means, a first electrical heater for locally heating the space temperature responsive thermostat, means responsive to changes in the relative humidity in the space for increasing the current flow to the electrical heater as the space relative humidity rises, a second electrical heater, and means responsive to changes in the outdoor temperature for decreasing the current flow through the second electrical heater as the outdoor temperature rises.

4. In a summer cooling system, in combination, means in control of the cooling of a space, a space temperature responsive thermal element for controlling said means, electrical means to vary the control action of the thermal element on said cooling control means, variable resistance means controlled by the outdoor temperature and the space relative humidity associated with said last-named means, for varying its action on the thermal element.

5. In combination, means in control of the cooling of a space, means responsive to the effective temperature of the space in control of the cooling controlling means for maintaining the effective space temperature constant while permitting the relative humidity thereof to fluctuate, electrical means to vary the action of said effective temperature responsive means, and an outdoor temperature responsive variable resistance means associated with said electrical means for increasing the effective temperature maintained in the space as the outdoor temperature increases.

6. In combination, means for changing the temperature of a space, a space temperature responsive thermostat in control of the temperature changing effect produced by said temperature changing means, electrical heating means associated with said space thermostat for locally heating the same whereby to change its response to space temperatures, a space moisture responsive control associated with said electrical heating means to vary the current flow therethrough, and a resistance device responsive to a temperature condition of the air external to said space associated with said electrical heating means to vary the current flow therethrough.

7. In a summer cooling system, in combination, means for cooling a space, a space dry bulb temperature responsive controller in control of the cooling effect of said cooling means, electrical heating means associated with said controller for locally heating the same whereby to change its response to space dry bulb temperatures, a variable resistance space moisture responsive controller associated with said electrical heating means to decrease the current flow therethrough as the moisture in the space decreases, and a variable resistance controller responsive to the dry bulb temperature of the air external to said space associated with said heating means to decrease the current flow therethrough as the external air dry bulb temperature increases.

8. In a temperature control system for a space, in combination, means to change the temperature of the space, space temperature responsive means in control of said temperature changing means, electrical means associated with said temperature responsive means to vary the response thereof upon variations in the energization of the electrical means, and variable resistance means responsive to an outdoor temperature condition in control of the energization of said electrical means.

9. In a cooling system, in combination, electrical means in control of the cooling of a space, a space temperature responsive controller in control of said electrical means, an electrical heating element associated with said space temperature responsive controller for locally heating the same, variable resistance means connected to said heating element in a manner to vary its heating effect upon said space temperature responsive controller, and means responsive to outside temperature in control of said variable resistance means and operative to operate the same in a manner to decrease the heating effect upon said heating element upon rise in outside temperature.

10. In a cooling system, in combination, electrical means in control of the cooling of a space, a space temperature responsive controller in control of said electrical means, an electrical heating element associated with said space temperature responsive controller for locally heating the same, a potentiometer including a relatively movable resistance element and contact, a source of power, a connection from one side of said source of power to one end of said resistance element, a connection from the other side of said source of power running both to the other side of said resistance element and one side of said electrical heating element, a connection from the other side of said electrical heating element to said contact, and means including an element responsive to outside temperature operative to cause relative movement between said resistance element and contact.

11. In combination, a temperature controlling circuit, a thermostat responsive to temperature changes within an enclosure adapted to make and break said circuit, a pair of heating coils positioned adjacent the thermostat and each adapted to directly apply heat to the thermostat so as to change the temperature that it will function to maintain within the enclosure, an energizing circuit for one of these coils, a variable resistance in this circuit, means responsive to temperature changes outside the enclosure for increasing this resistance as the outside temperature rises and for decreasing the resistance as the outside temperature falls, an energizing circuit for the second heating coil, a variable resistance in this latter heating circuit, and means responsive to changes in the relative humidity of the air for decreasing this latter resistance as the humidity increases, and increasing the resistance as the humidity decreases.

12. In combination with means for cooling an enclosure, a thermostat responsive to temperature changes within an enclosure adapted to make and break the circuit, an electric-heating element positioned adjacent the thermostat to directly and continuously apply a predetermined heat correction to the thermostat so as to select the temperature that it will function to maintain within the enclosure, an energizing circuit for this heating element, a variable resistance in this heating circuit, and means responsive to temperature changes outside the enclosure for increasing the resistance as the outside temperature rises and decreasing the resistance as the outside temperature falls whereby, within a certain temperature range, a higher temperature will be maintained within the enclosure as the outside temperature rises and a lower temperature will be maintained within the enclosure as the outside temperature falls.

13. In combination, means for cooling a space, a space temperature responsive thermostat in control of the cooling means, heating means for locally heating the space temperature responsive thermostat, a space relative humidity controller for operating the heating means to increase its heating effect upon the space temperature responsive thermostat as the relative humidity of the space increases, and an outdoor temperature responsive thermostat for operating the heating means to decrease the heating effect of the heating means upon the space temperature responsive thermostat as the outdoor temperature rises.

14. In combination, temperature changing means for regulating the temperature in a space, thermostatic means responsive to the dry bulb temperature in the space for controlling the temperature changing means to regulate the dry bulb temperature in the space, heating means for locally heating the thermostatic means to adjust the control point thereof, control means responsive to the relative humidity in the space for operating the heating means to increase its heating effect upon the thermostatic means as the relative humidity in the space increases to maintain desired effective temperature conditions in the space regardless of fluctuations in space relative humidity, and control means responsive to temperature conditions outside of the space for operating the heating means to decrease its heating effect upon the thermostatic means as the outside temperature increases to cause the effective temperature conditions maintained in the space to be raised as the outside temperature increases and to be lowered as the outside temperature decreases.

15. In combination, temperature changing means for regulating the temperature in a space, thermostatic means responsive to the dry bulb temperature in the space for controlling the temperature changing means to regulate the dry bulb temperature in the space, electrical means for varying the control action of the thermostatic means on the temperature changing means, variable resistance means controlled by space relative humidity for controlling the electrical means to maintain desired effective temperature conditions in the space regardless of fluctuations in space relative humidity, and variable resistance means controlled by temperature conditions outside of the space for controlling the electrical means to cause the effective temperature conditions maintained in the space to be raised as the outside temperature increases and to be lowered as the outside temperature decreases.

PAUL F. SHIVERS.